United States Patent [19]
Biskeborn et al.

[11] Patent Number: 5,905,613
[45] Date of Patent: May 18, 1999

[54] BIDIRECTIONAL FLAT CONTOUR LINEAR TAPE RECORDING HEAD AND DRIVE

[75] Inventors: Robert Glenn Biskeborn, Hollister; James Howard Eaton, Morgan Hill, both of Calif.

[73] Assignee: International Business Machines Corporation, Armonk, N.Y.

[21] Appl. No.: 08/896,782

[22] Filed: Jul. 18, 1997

[51] Int. Cl.[6] .................................................. G11B 15/60
[52] U.S. Cl. ...................................................... 360/130.21
[58] Field of Search .................................. 360/121, 122, 360/130.21

[56] References Cited

U.S. PATENT DOCUMENTS

| | | | |
|---|---|---|---|
| 3,398,870 | 8/1968 | Mullan et al. | 226/97 |
| 3,665,436 | 5/1972 | Murray | 360/121 |
| 3,737,582 | 6/1973 | DeMoss | 179/100.2 |
| 4,797,767 | 1/1989 | Baus | 360/121 |
| 4,875,129 | 10/1989 | Favrou et al. | 360/122 |
| 4,967,300 | 10/1990 | Reid | 360/122 |
| 5,142,768 | 9/1992 | Aboaf | 360/122 |
| 5,220,473 | 6/1993 | Brock | 360/121 |
| 5,307,227 | 4/1994 | Okada et al. | 360/122 |
| 5,404,260 | 4/1995 | Machui et al. | 360/126 |
| 5,541,793 | 7/1996 | Schwarz | 360/121 |
| 5,710,683 | 1/1998 | Sundaram | 360/126 |

*Primary Examiner*—A. J. Heinz
*Attorney, Agent, or Firm*—John H. Holcombe

[57] ABSTRACT

A bidirectional linear thin film tape head and drive are disclosed with a flat contour on a wear resistant ceramic substrate. At least one thin film transducer is provided on a side of the substrate, forming one edge to the flat transducing surface, and another edge is formed at the opposite side of the flat transducing surface. In one embodiment, both the transducer edge, with an alumina overcoat protecting the transducer, and the opposite edge of the flat transducing surface form outer tape path edges, and in another embodiment, the thin film transducer is protected by a ceramic closure that covers the thin film transducer and forms an extension to the flat transducing surface which provides an outer tape path edge. The edges remove the air entrained by the tape moving relative to the head in either direction to allow contact or near contact recording with the flat transducing surface.

42 Claims, 9 Drawing Sheets

(Prior Art)

BIDIRECTIONAL FLAT CONTOUR LINEAR TAPE RECORDING HEAD AND DRIVE

FIELD OF THE INVENTION

This invention relates to linear tape recording, and, more particularly, to a bidirectional flat contour long life head and drive.

BACKGROUND OF THE INVENTION

Conventional multitransducer recording heads for bidirectional linear tape drives have transducers fabricated on a ferrite or other ceramic substrate using thin film wafer technology. Bleed slots for removing air are cut into the ferrite substrate transducing surface on both sides of the transducers, and the surface is then lapped to a desired contour. The conventional contour comprises a cylindrical or complex shape which is critical in maintaining the moving tape at the desired head to transducer spacing (called "contact" recording). The contact, or near contact, spacing is maintained by controlling the contour shape to "bleed", "skive" or "scrape" the boundary layer of air carried by the tape away and into the bleed slots before encountering the transducer to prevent the tape from "flying", or losing contact with the transducer.

The contact between the magnetic head and the magnetic tape is crucial so that the recording gaps of the transducers, which are the source of the magnetic recording flux, are in intimate or near contact with the tape to effect efficient signal transfer, and so that the playback element is in intimate or near contact with the tape to provide effective coupling of the magnetic field from the tape to the playback element.

Typically, the contour is designed with a small radius and a high wrap angle so that high pressure is exerted on the head while the tension is low. However, the contour of the head must be such that the pressure of the tape on the transducer is not so high that the surface of the transducer wears excessively.

Such heads are often provided with "outriggers" on both sides of the head which help support the tape and reduce head wear, but, more importantly, control the wrap angle of the tape with respect to the head. Any change in radius will change the pressure of the tape on the head at the same tape tension.

Figure 1:
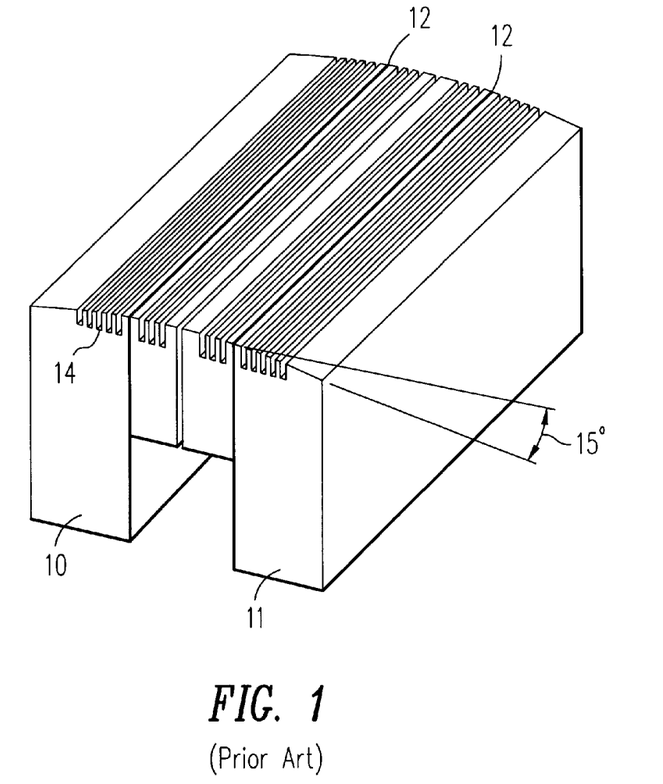
FIG. 1 is a perspective illustration of a bidirectional tape head of the prior art.
Figure 2:
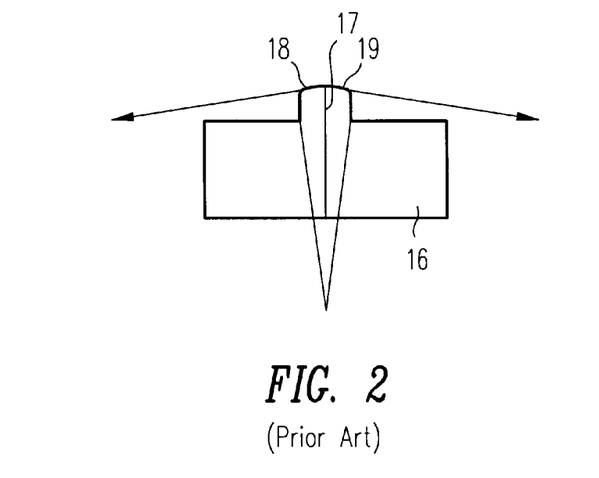
FIG. 2 is an end view illustration of another bidirectional tape head of the prior art.

Referring to FIGS. 1 and 2, prior art bidirectional linear tape drives have typically used tape heads with a cylindrical contour.

The prior art high speed bidirectional linear tape head of FIG. 1 illustrates two modules 10 and 11, each having a transducing gap 12, with cross slots 14 to bleed out air entrained between the head contour and moving tape. The conventional cylindrical contour 15 is used to maintain the moving tape in contact or near contact with the head. The contact, or near contact, spacing is maintained by controlling the contour shape to bleed the boundary layer of air carried by the tape away and into the bleed slots 14 before encountering the transducer to prevent the tape from "flying", or losing contact with the transducer.

The prior art low cost bidirectional tape head of FIG. 2 employs a single module 16 of two halves forming a single transducing gap 17 employing a small radius cylindrical contour 18 with a very short land of about 14 degrees and an edge 19 to remove the entrained air without the need for air bleed slots. Lapping of the tape head assembly and of the corresponding outriggers to a contour is very expensive and is a major contributor to the manufacturing cost of the tape head.

A 1973 patent, U.S. Pat. No. 3,737,582 suggests a substantially flat ferrite magnetic core head with carbide inserts at the edges. The edges are required to have a back angle of 95 degrees from the tape direction to provide self-sharpening of the edges. Unlike modern thin film heads, intimate contact with the transducing gap was not required. With modern thin tapes and high tape speeds, the head and the tape must be in intimate contact and this will cause undesirable wear to the ferrite and in the gap area between the inserts. This means that upon a change in tape thickness or tension that intimate contact with the tape would be lost.

A flat contour linear tape head has been proposed for a single direction magnetic tape drive, which must rewind the tape out of contact with the head upon the completion of reading and/or writing the tape. "Contact Tape Recording with a Flat Head Contour", H. Hinteregger and S. Muftu, Massachusetts Institute of Technology Haystack Observatory, Westford, Mass. 01886, Mar. 2, 1996. The flat contour head comprised a row of thin film disk heads formed on ceramic, and the tape was wrapped at approximately 2 degrees over the hard ceramic corner of the bar and not wrapped at all over the soft thin film trailing corner.

The flat contour also provided good transducing and wear characteristics, but was not usable in a bidirectional linear tape drive.

SUMMARY OF THE INVENTION

An object of the present invention is to provide a flat contour long life thin film tape recording head which is usable in a bidirectional linear tape drive.

A bidirectional linear thin film tape head and drive are disclosed with a flat contour on a wear resistant ceramic substrate. At least one thin film transducer is provided on a side of the substrate, forming one edge to the flat transducing surface, and another edge is formed at the opposite side of the flat transducing surface.

In one embodiment, both the transducer edge and the opposite edge of the flat transducing surface form outer tape path edges at which the tape may approach or leave the flat transducing surface of the wear resistant ceramic substrate. The thin film transducer is protected at the transducer edge, in the one embodiment, by an alumina overcoat covering the thin film transducer.

In an alternative embodiment, the thin film transducer is protected by a ceramic closure that covers the thin film -transducer and forms an extension to the flat transducing surface which provides an outer tape path edge.

The outer tape path edges of the flat transducing surface comprise slope discontinuities at which the tape may approach or leave the head at low wrap angles of between about ⅛ degree to about 4.5 degrees. The slope discontinuities are at an angle greater than 10 degrees for removing the air entrained by the tape as it moves relative to the head in either direction. Removal of the entrained air allows intimate contact between the tape and flat transducing surface for recording. The width of the flat transducing surface between the slope discontinuities is preferably about 600 to 1200 microns. The alumina or ceramic material of the substrate gives the bidirectional flat contour linear tape head a long life.

Other objects, features, and advantages of the present invention will be apparent from the accompanying drawings and from the detailed description below.

BRIEF DESCRIPTION OF THE DRAWINGS

The present invention is illustrated by way of example and not limitation in the figures by the accompanying drawings in which like references indicate similar elements and in which.

DETAILED DESCRIPTION OF THE INVENTION

Figure 3:
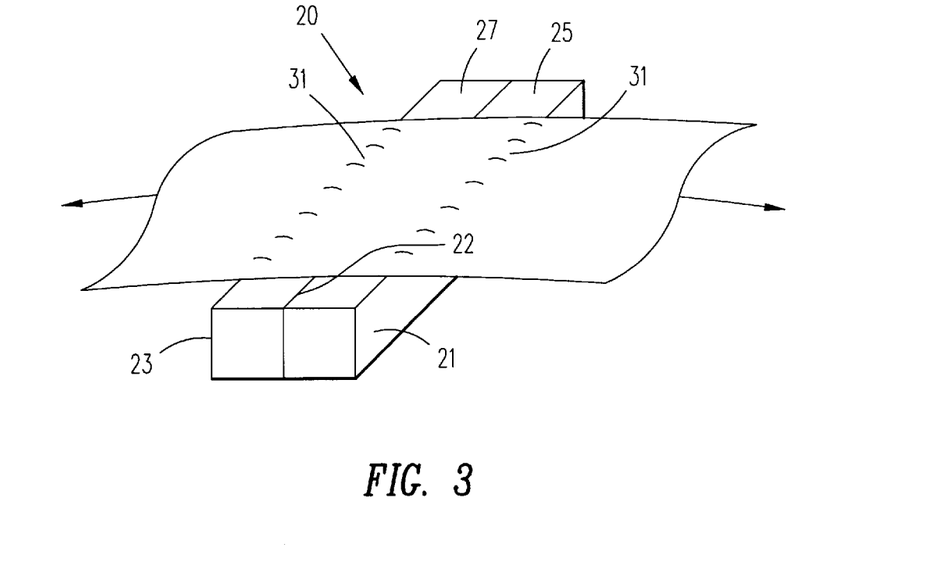
FIG. 3 is a perspective illustration of one embodiment of a bidirectional tape head of the present invention.
Figure 4:
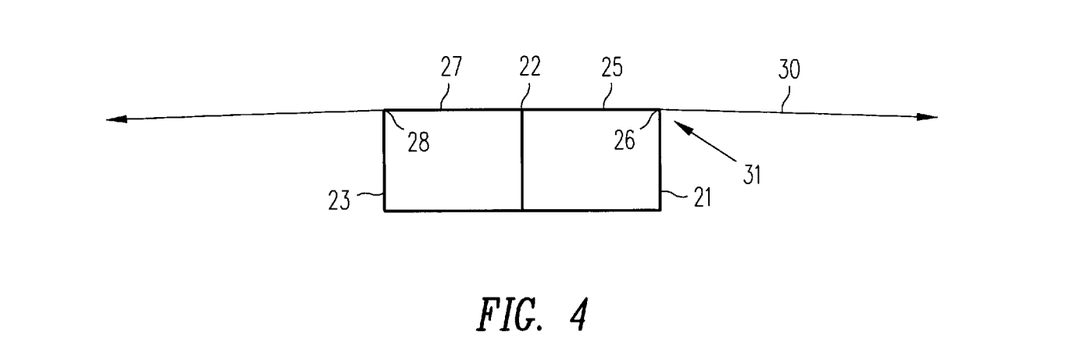
FIG. 4 is an end view illustration of the tape head of FIG. 3.

FIGS. 3 and 4 illustrate an embodiment of a flat contour head 20 in accordance with the present invention. A substrate 21 of a wear resistant material, such as the substrate ceramic typically used in a magnetic disk drive heads, for example, alumina and titanium carbide in a sintered matrix, has a row of thin film transducers formed on a surface on one side of the substrate which forms gap 22. The substrate with the row of transducers is called a "rowbar substrate". The transducers are protected by a closure 23 made of the same or similar ceramic as the rowbar substrate 21.

For one embodiment of the present invention, the transducers are thin film, formed on the deposition surface of the ceramic material by conventional deposition and etching techniques. Closure 23 overlies the deposited transducers and does not complete the magnetic circuit. Thus, the "gap" of the heads of the present invention provides the location of the thin film transducers, and the "closure" 23 of the heads of the present invention is to protect the thin film transducers and to allow bidirectional recording.

In FIGS. 3 and 4, the rowbar substrate 21 is provided with a flat transducing surface 25 with gap 22 at one end. Edge 26 is opposite the gap 22. Closure 23 has a flat surface 27 which forms an extension to the rowbar substrate flat transducing surface 25, and has an edge 28 at the end of flat surface 27 opposite the gap 22.

A recording tape 30 overwraps both the corner 26 of substrate 21 and the corner 28 of the closure 23 with an angle 31 sufficient to scrape the air from the surface of the tape and not so large as to allow air to re-enter between the tape and flat surface 25 or 27 after the tape passes the corner. By scraping the air from the surface of the moving tape 30 by the edge 26 or 28, a vacuum forms between the tape and the flat surface 25 or 27 in the direction of movement of the tape, holding the tape in contact with the flat surface.

A slope discontinuity of 10 degrees or more at corners or edges 26 and 28 is adequate to "skive" the air off in the flat head contour. Hereinafter, edges of the flat head contour are defined as "slope discontinuity edges".

Figure 5:
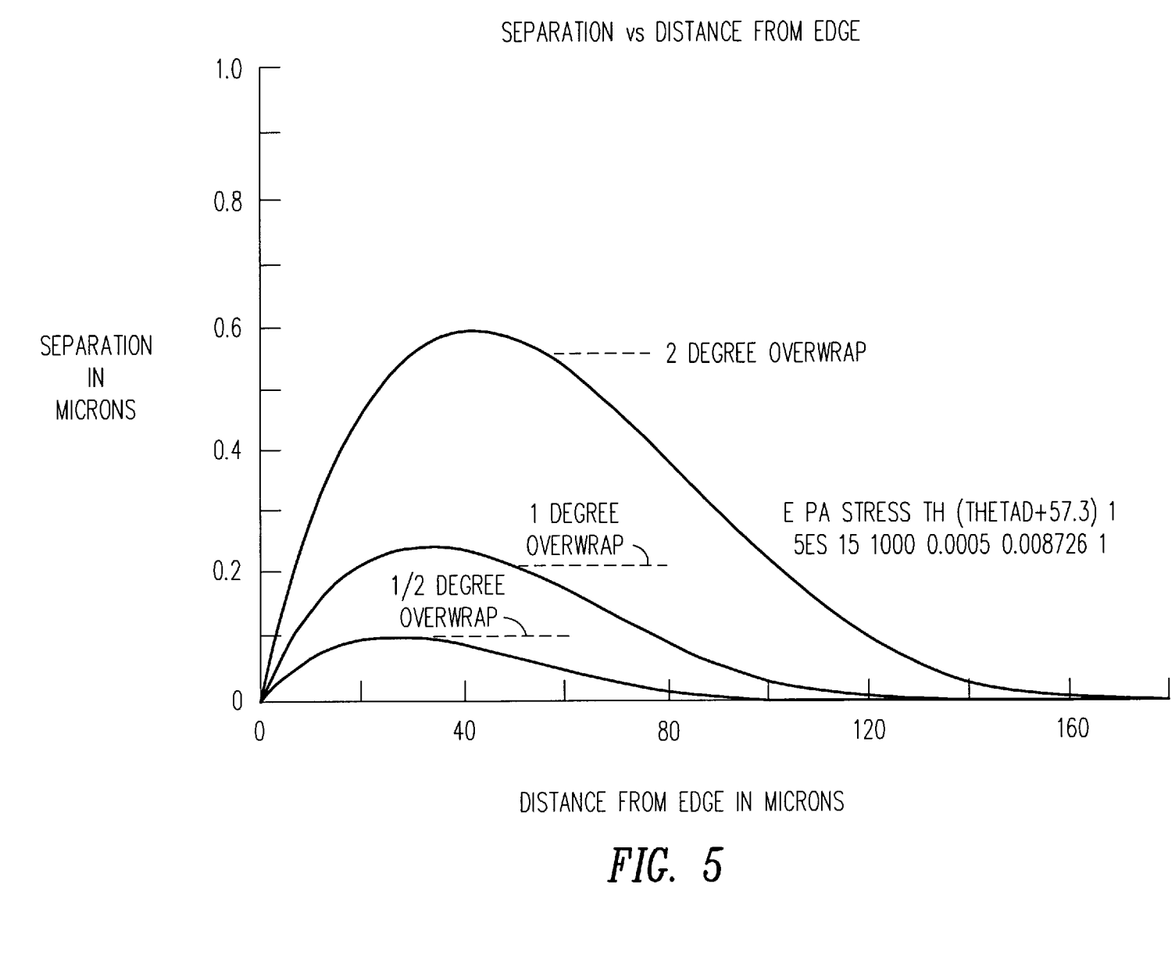
FIG. 5 is a graph of the separation of the tape versus the distance from the edge of the tape head of FIGS. 3 and 4.

FIG. 5 shows the calculated spacing between a moving tape 30 and flat surface 25 or 27 for ½ degree, 1 degree and 2 degrees of overwrap. Note that the slope of the tape as it crosses the edge is about ⅓ the overwrap angle. The calculation assumes no air is entrained or leaks between the sharp corner and the tape and that a vacuum is produced to pull the tape down to the flat surface. A wrap angle of the order of ⅛ degree is sufficient to scrape off the air and bring the moving tape into contact with the flat surface. For typical tape thickness and tape tension, a trap angle of more than 4 to 5 degrees allows sufficient air to leak into the sides of the tape beyond the corner so that the tape is not held down on the transducing surface.

With a low wrap angle such as ⅛ degree the tape maintains good contact at the recording element embedded in the flat transducing surface except near the edges of the tape. The edge of the tape lifts off of the transducing surface for a distance equivalent to approximately 50 times the thickness of the tape for transducing surfaces 2000 or more microns long (in the tape moving direction). This effect is driven by anticlastic bending of the tape edge. For present tape thicknesses and tape tensions, this problem is minimized by increasing the wrap angle to 1.5 to 2.5 degrees and reducing the length of the flat transducing surface to 600–1200 microns. Further reduction of the length of the flat transducing surface causes the tape to begin to lift off in the center of the transducing surface. This minimizing length scales down proportional to tape thickness.

Referring again to FIGS. 3 and 4, the corners 26 and 28, or slope discontinuity edges, are essential to production of the vacuum between the bidirectionally moving tape 30 and the flat surfaces 25 and 27. The use of a wear resistant rowbar substrate ceramic material, such as alumina and titanium carbide, for the substrate 21 and the closure 23 allows the edges and flat transducing surface to be maintained without excessive wear and thereby allows the resultant head to be used for bidirectional tape drives.

Figure 6:
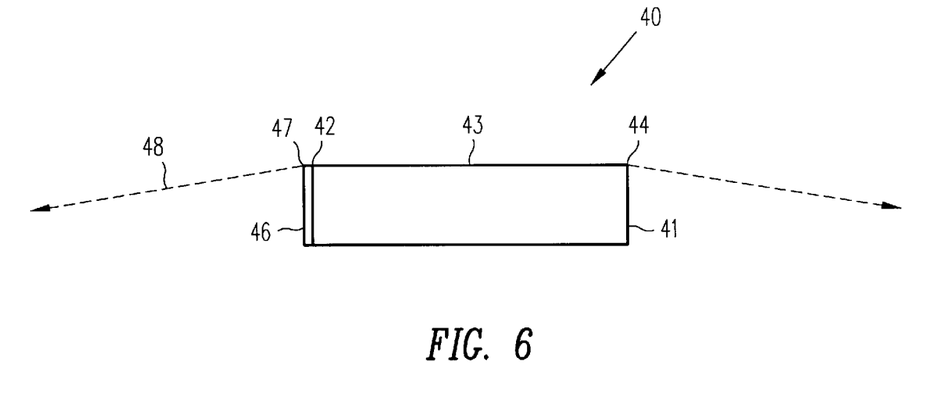
FIG. 6 is an end view illustration of another embodiment of a bidirectional tape head of the present invention.

FIG. 6 illustrates an alternative embodiment of a bidirectional linear flat contour tape head 40 in accordance with the present invention. Rowbar substrate 41 is formed of wear resistant material such as ceramic, and a row of thin film transducers is formed on the surface of the rowbar substrate 41 forming a face of the gap 42. The transducer surface of rowbar substrate 41 forms an edge 47 with flat transducing surface 43. Edge 44 is located at the opposite side of flat transducing surface 43. For one embodiment, a wear resistant overcoat, such as alumina, 46 is formed over the transducers on the gap surface of the rowbar substrate 41 to protect the transducers at gap 42 and edge 47. Thus, tape 48 may be provided with the appropriate wrap angles as discussed above to overwrap the edges 44 and 47 to bring the tape in contact with the flat transducing surface 43. Since the alumina overcoat 46 is not as hard as the rowbar substrate 41, the overwrap of the alumina edge 47 is preferably small and controlled so as to prevent excessive erosion of the edge or of the thin film head transducer elements. A ⅛ to ½ degree overwrap of the alumina edge is preferred in this embodiment.

Figure 7:
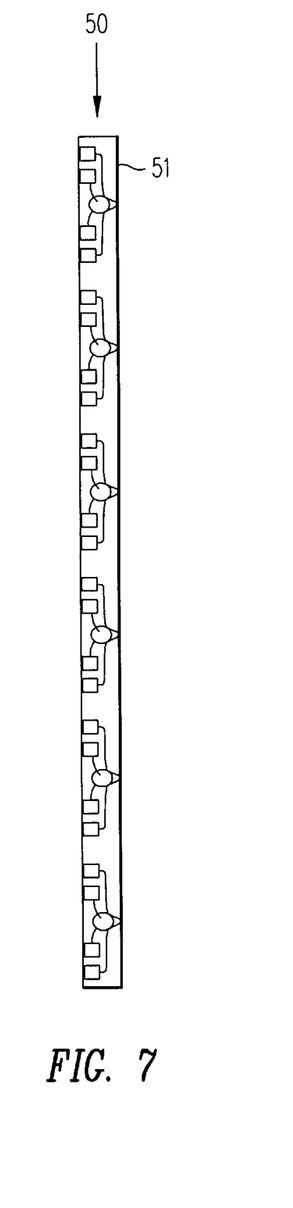
FIG. 7 is a planar illustration of the transducers of the tape head of FIGS. 3 and 4 or of FIG. 6.
Figure 8:
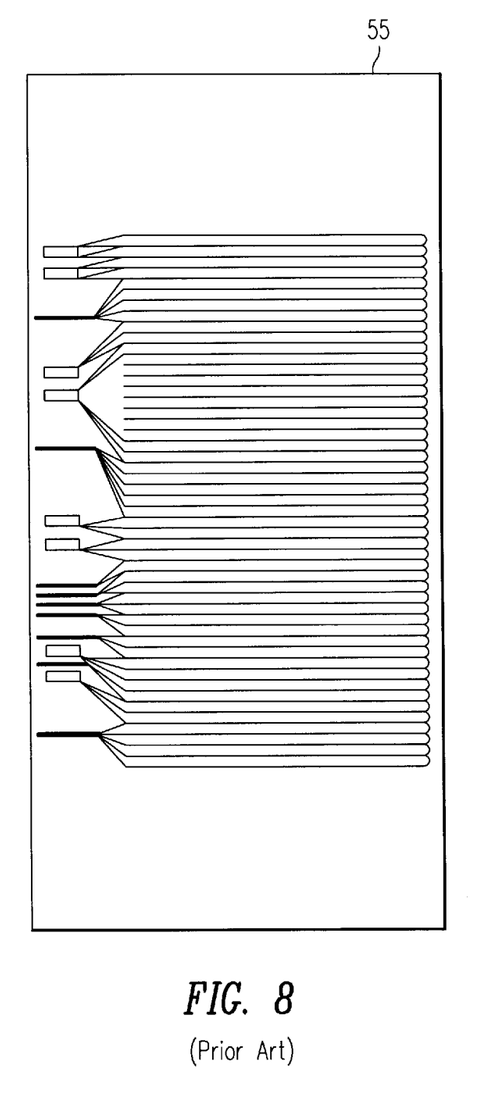
FIG. 8 is a planar illustration of the transducer connections of the prior art as used in the head of FIG. 1.

FIG. 7 illustrates a row 50 of magnetic transducers formed on a ceramic rowbar substrate 51 for an embodiment of the present invention. Although the illustrations are not to scale, the small height (about 0.75 mm) of the rowbar substrate 51 is to be contrasted to the height (about 5 mm) of a typical substrate 55 of a bidirectional head of the prior art having a cylindrical contour, illustrated in FIG. 8. The smaller substrate of the present invention allows a significantly greater number of heads to be formed on a wafer of such substrates.

In practice, it is desirable to maintain the angle of overwrap constant so that wear of the corner will not allow air entrainment. For example, if the tape is operated with an overwrap of 4 degrees for a time sufficient to wear a slight bevel of the corner, and is then operated at a 1 degree overwrap, air entrainment as the tape passes over the bevel could prevent the vacuum from forming over the flat surface and allow excessive spacing at the recording gap. For typical tape drive operating conditions, a bevel 10 mils long and a fraction of a mil deep is sufficient to cause air entrainment.

Figure 9:
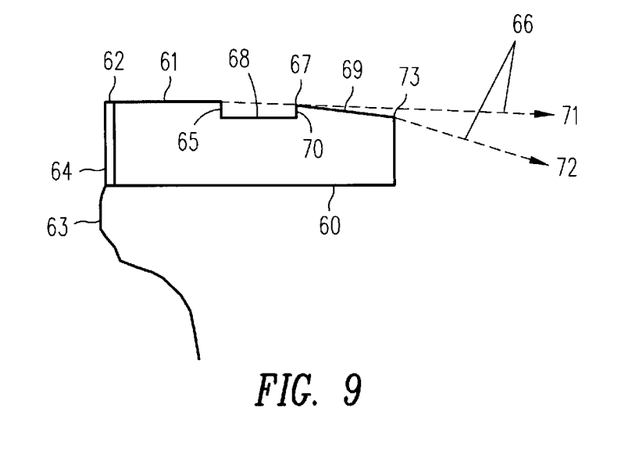
FIG. 9 is an end view illustration of another embodiment of a bidirectional tape head of the present invention.

Thus, FIG. 9 illustrates an alternative embodiment of the present invention based on the linear bidirectional tape head of FIG. 6. A ceramic rowbar substrate 60 is provided with a flat transducing surface 61 and a row of transducers on the surface of gap 62. An electrical connection cable 63 connects the transducers to the read/write channel of the associated tape drive. Alumina overcoat 64 protects the transducers and forms a slope discontinuity edge with respect to the flat transducing surface 61. A slope discontinuity edge 65 is formed parallel to the gap 62 at the side of the flat transducing surface 61 opposite the gap surface.

To control the overwrap angle of the tape 66 at edge 65, an outrigger 67 is provided. The outrigger 67 may be formed by cutting a groove 68 in the substrate 60. A taper 69 may be lapped on the outrigger 67, preferably at an angle about midway between the expected wrap angles the head will be presented with for various cartridges, as will be explained. The depth of the taper 69 is controlled so that the line from edge 65 to edge 70 is at the desired overwrap angle with respect to the flat transducing surface 61.

The head penetration into the tape 66 of a cartridge is controlled so that at the minimum wrap angle 71, the tape just touches the edge 70. Thus, for various cartridges, the tape wrap can move between the positions indicated by 71 and 72, while the outrigger 67 maintains a constant wrap angle onto the flat transducing surface 61. The flat taper 69 between edges 70 and 73 is easily lapped and is economical to produce. At additional expense, a cylindrical or curved surface could be lapped from edge 70 to edge 73 and matching the tape angle at edge 73.

The preferred angle going onto the flat transducing surface 61 at edge 65 is between ⅛ degree and 4.5 degrees.

Figure 10:
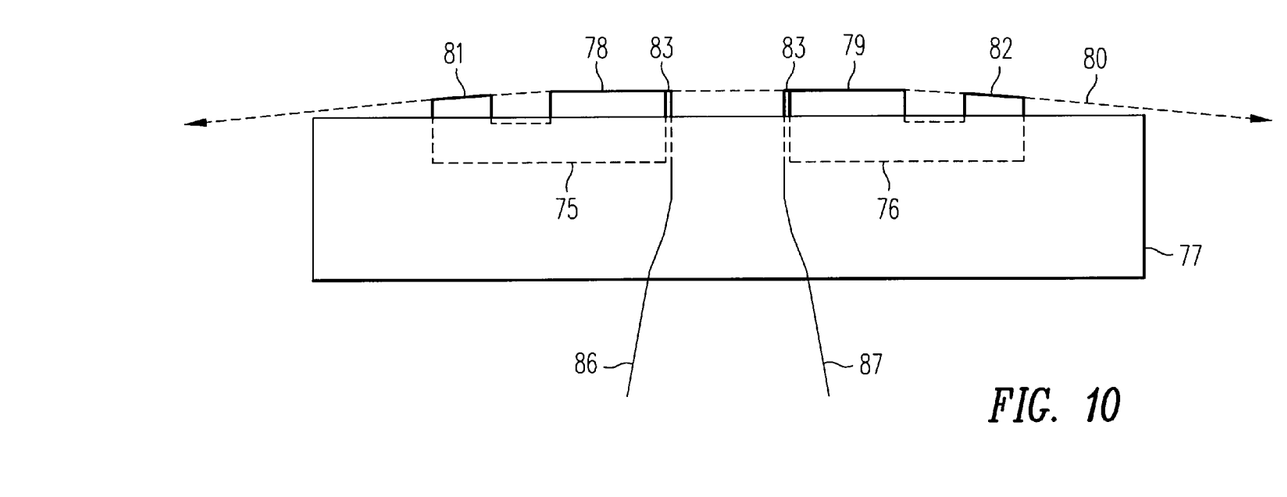
FIG. 10 is an end view illustration of two of the tape heads of FIG. 9 arranged in a read-while-write relationship.

FIG. 10 illustrates a preferred embodiment of the head assembly of FIG. 9 for a read-while-write bidirectional linear tape drive. "Read-while-write" means that the read transducer follows behind the write transducer. This arrangement allows the data just written by the write transducer to be immediately checked for accuracy and true recording by the following read transducer.

Specifically, in FIG. 10, two rowbar substrates and outriggers 75 and 76 as illustrated in FIG. 9 are mounted in a carrier 77 facing one another. The wrap angle onto the flat transducing surfaces 78 and 79 of the tape 80 is held constant using the outriggers 81 and 82 as described above for the tape coming from outside the head. For tape entering the flat transducing surfaces 78 and 79 at the alumina edges 83, the wrap angles are held constant by tilting the rowbars, for example, ¼ degree each, downward and away from one another, and holding the rowbars fixed with respect to one another in carrier 77.

Electrical connection cables 86 and 87 connect the transducers in gaps 83 to the read/write channel of the associated tape drive for reading and/or writing, and reading while writing, as described above.

Figure 11:
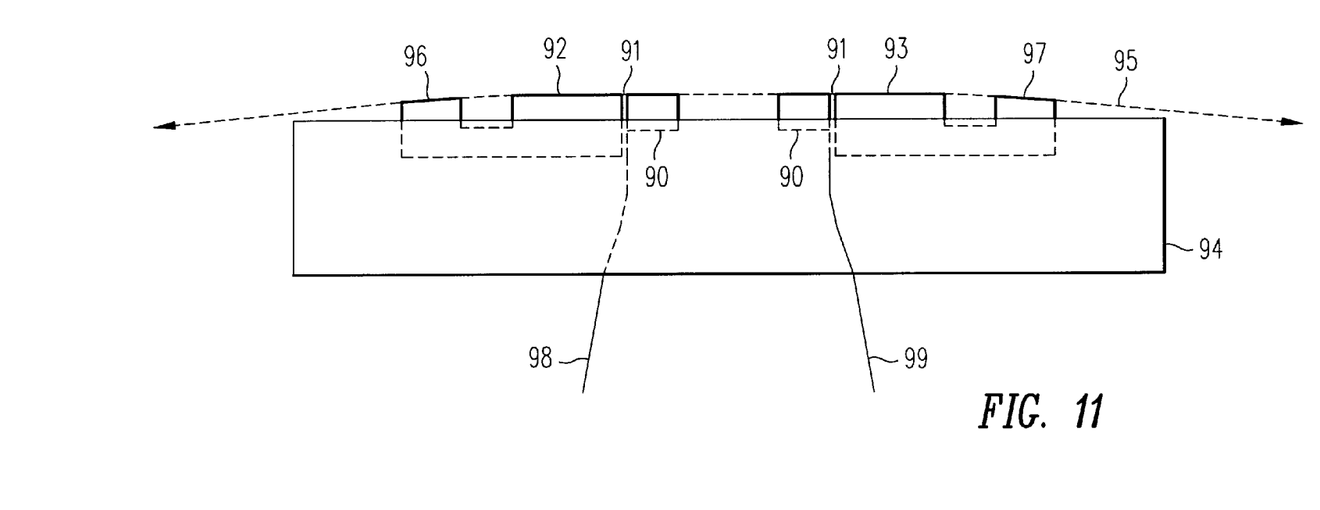
FIG. 11 is an end view illustration of two of the tape heads of FIG. 3 arranged in a read-while-write relationship.

A more rugged embodiment of two rowbar substrates with the "closed" rowbars of FIGS. 3 and 4 is illustrated in FIG. 11, with the outriggers described with respect to FIG. 9. Ceramic closures 90 overlie and protect the rows of transducers in gaps 91, and form extensions to the flat transducing surfaces 92 and 93. As with respect to the embodiment of FIG. 10, the flat transducing surfaces 92 and 93 of FIG. 11 are tilted downward and away from one another, and fixed in carrier 94, thereby providing a constant wrap angle of tape 95 between the rowbars. Outriggers 96 and 97 may be employed on the other edges of the rowbars to accommodate variation in wrap angle of the tape 95 over the head by maintaining a constant wrap angle onto the flat transducing surfaces 92 and 93.

Electrical connection cables 98 and 99 connect the transducers in gaps 91 to the read/write channel of the associated tape drive for reading and writing, as described above.

Figure 12:
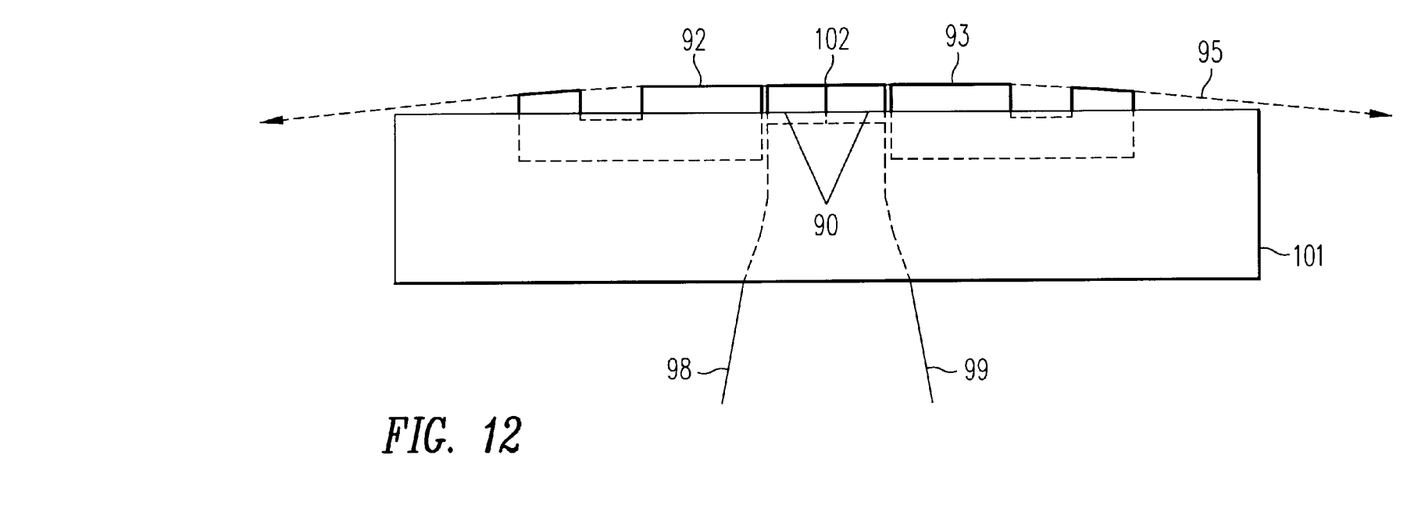
FIG. 12 is an end view illustration of another embodiment of two of the tape heads of FIG. 3 arranged in a read-while-write relationship.

FIG. 12 illustrates an alternative embodiment of a read-while-write tape head assembly in accordance with the present invention. In the embodiment of FIG. 12, the rowbar substrates and closures 90, as in FIG. 11, are abutted in the carrier 101. A discontinuity at apex 102 of more than approximately a micron between the two flat transducing surfaces 92 and 93 of the rowbars would allow air to enter under the tape 95 and destroy the vacuum holding the tape to the flat surfaces 92 and 93. The angle between the two flat surfaces is provided so that the discontinuity can be lapped smooth in a third plane that does not approach too closely to the gaps of the rowbars. Alternatively, the head rowbars could be joined with a common closure piece and the transducer heights of each rowbar lapped at an angle. The angle allows the desired transducer (throat and stripe) heights to be achieved in both rowbars even if the lines containing these desired heights do not lie in the same plane. Electrical connection cables 98 and 99 connect the transducers to the read/write channel of the associated tape drive for reading and writing, as described above.

Figure 13:
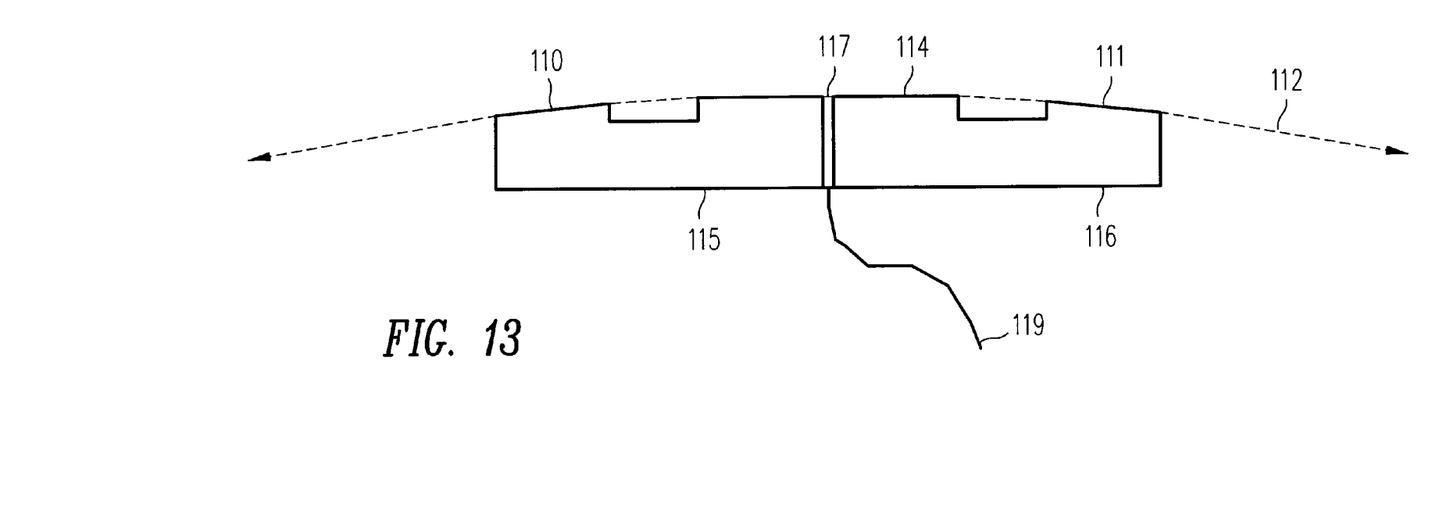
FIG. 13 is an end view illustration of still another embodiment of a bidirectional tape head of the present invention.

FIG. 13 illustrates a preferred embodiment of a "closed" bidirectional linear flat head, of the type described with respect to FIGS. 3 and 4, with outriggers 110 and 111 to control the wrap angle of tape 112 onto the flat transducing surface 114. Ceramic rowbar substrates 115 and 116 may be identical, only one having the row of transducers formed thereon. Thus, the ceramic rowbar substrate having the row of transducers may be considered the "rowbar", and the other rowbar substrate may be considered the "closure". The two substrates are maintained flat and lapped to the appropriate depth to attain the desired transducer heights of the row of transducers in gap 117. An electrical connection cable 119 connects the transducers to the read/write channel of the associated tape drive for reading and/or writing.

Figure 14:
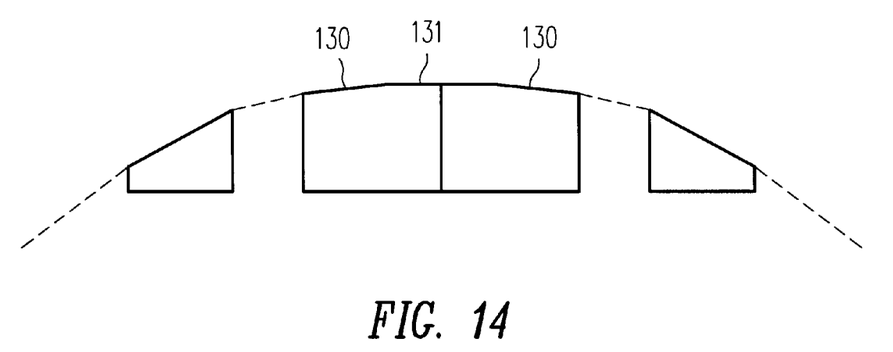
FIG. 14 is an end view illustration of an embodiment of a faceted bidirectional tape head of the present invention.
Figure 15:
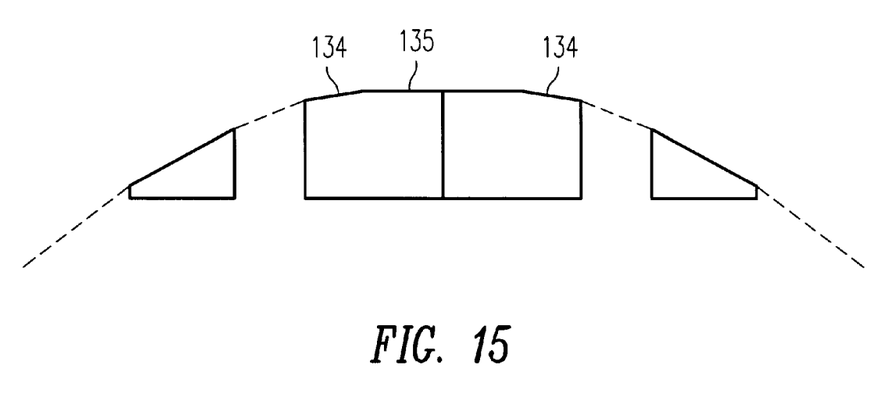
FIG. 15 is an end view illustration of an embodiment of a blended contour tape head of the present invention.

As discussed above, with the low wrap angle between about ⅛ degree and about 4.5 degrees, the tape maintains good contact at the recording element embedded in the flat transducing surface except near the edges of the tape. The edge of the tape lifts off of the transducing surface for a distance equivalent to approximately 50 times the thickness of the tape for transducing surfaces 2000 or more microns long (in the tape moving directions). This effect is driven by anticlastic bending of the tape edge. For present tape thickness and tape tension, this problem is minimized by increasing the wrap angle to 1.5 to 2.5 degrees and reducing the length of the flat transducing surface to 600–1200 microns. Further reduction of the length of the flat transducing surface causes the tape to begin to lift off in the center of the transducing surface. This minimizing length scales down proportional to tape thickness. As illustrated in FIG. 14, the effect is further minimized by introducing one or a multiplicity of facets 130 near the edge of the flat transducing surface 131. The first facet should produce a slope discontinuity of less than ½ degree at the facet edge nearest the recording element embedded in the flat transducing surface. Subsequent facets can produce larger slope discontinuities. Edge liftoff is further reduced by blending a curved surface 134 into the flat transducing surface 135, as illustrated in FIG. 15. This curved surface should have a large radius at the edge nearest the recording element in the flat surface and a smaller radius at the edge nearest the outrigger. Preferred radii are in the range of 50 and 5 millimeters respectively.

Figure 16:
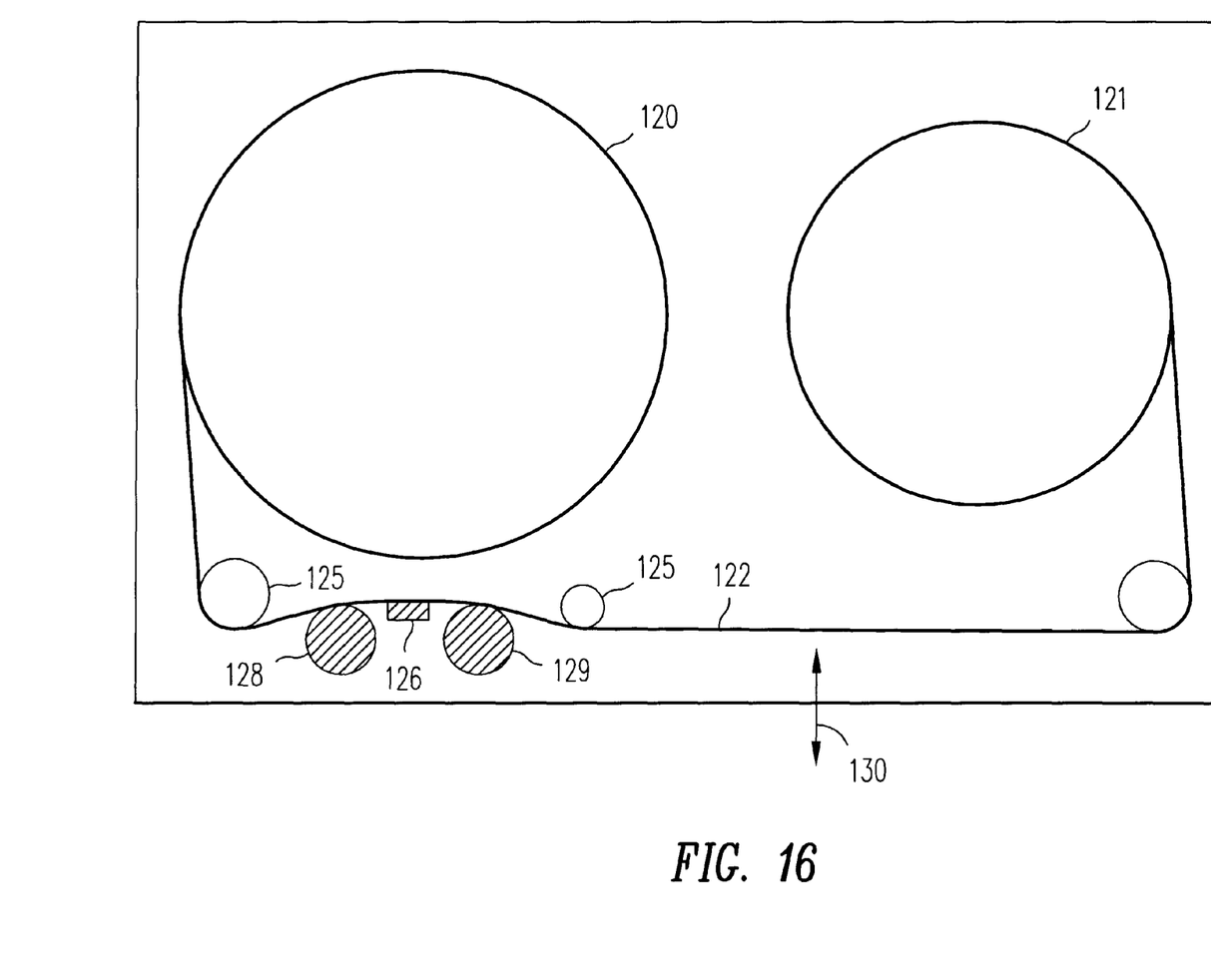
FIG. 16 is a diagrammatic illustration of a tape drive employed with a tape head of the present invention and typical tape path.

FIG. 16 illustrates a tape drive which may be employed with the bidirectional flat contour linear tape head for one embodiment of the present invention. Tape reels 120 and 121 support tape 122, and cartridge guide pins 125 guide the tape 122 across the bidirectional tape head 126. As an alternative to the outriggers of the heads of FIGS. 9 through 13, the tape drive may provide fixed pins 128 and 129 to maintain a constant wrap angle onto the head 126 even though different cartridges have small variation in position relative to the drive, as illustrated by arrows 130.

A tape drive, such as that illustrated in FIG. 16, will include drive motor(s) to drive the reels 120 and 121 to move the tape linearly over the head 126. The tape drive will also include a read/write channel to transmit data to the head 126 to be recorded on the tape 122 and to receive data read by the head 126 from the tape 122. An interface will also be provided for communication between the tape drive and a host to send and receive the data and for controlling the operation of the tape drive and communicating the status of the tape drive to the host, all as understood by those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A bidirectional linear thin film tape head for use with a magnetic recording tape passing thereover, comprising:
    a ceramic rowbar substrate having a flat transducing surface and at least one thin film transducer on a gap surface on a side of said substrate, said thin film transducer forming an extension to said flat transducing surface;
    a slope discontinuity edge at said flat transducing surface opposite said gap surface of 10 degrees or more with said flat transducing surface;
    an alumina overcoat covering said thin film transducer on a side thereof opposite said gap surface of said substrate and forming a further extension to said flat transducing surface, and forming a slope discontinuity edge of 10 degrees or more with said flat transducing surface; and
    at least one outrigger spaced from said ceramic rowbar substrate for controlling the wrap angle of said tape at said ceramic rowbar substrate to an angle between about ⅛ of a degree to about 4.5 degrees.

2. The bidirectional linear thin film tape head of claim 1 wherein said at least one outrigger comprises ceramic.

3. The bidirectional linear thin film tape head of claim 2 wherein said ceramic comprises alumina and titanium carbide.

4. The bidirectional linear thin film tape head of claim 1, further comprising:
    a second ceramic rowbar and alumina overcoat opposite to, spaced from and facing said gap surface.

5. The bidirectional linear thin film tape head of claim 4 wherein said flat transducing surfaces of said ceramic rowbar and said second ceramic rowbar are sloped downward and away from each other so as to form said wrap angle at each said gap surface thereof.

6. The bidirectional linear thin film tape head of claim 5, further comprising:
    a carrier mounting said ceramic rowbar and said second ceramic rowbar.

7. The bidirectional linear thin film tape head of claim 5, further comprising:
    two outriggers, each spaced from one of said ceramic rowbar substrates for controlling the wrap angle of said tape at said ceramic rowbar substrates.

8. The bidirectional linear thin film tape head of claim 1, further comprising:
    a facet between said flat transducing surface and said opposite edge forming slope discontinuity of less than ½ of a degree with said flat transducing surface.

9. The bidirectional linear thin film tape head of claim 1, further comprising:
    a blended curved surface between said flat transducing surface and said opposite edge having the larger radius nearest said flat transducing surface and a smaller radius nearest said opposite edge.

10. A bidirectional linear thin film tape head for use with a magnetic recording tape passing thereover, comprising:
    a ceramic rowbar substrate having a flat transducing surface and at least one thin film transducer on a gap surface on a side of said substrate, said thin film transducer forming an extension to said flat transducing surface;
    a slope discontinuity edge at said transducing surface opposite said gap surface of 10 degrees or more with said flat transducing surface;
    a ceramic closure covering said thin film transducer on a side thereof opposite said gap surface of said substrate and forming a further extension to said flat transducing surface, and forming a slope discontinuity edge with respect to said flat transducing surface in front of said gap surface of 10 degrees or more with said flat transducing surface; and
    at least one outrigger spaced from said ceramic rowbar substrate for controlling the wrap angle of said tape at said ceramic rowbar substrate to an angle between about ⅛ of a degree to about 4.5 degrees.

11. The bidirectional linear thin film tape head of claim 10 wherein said at least one outrigger comprises ceramic.

12. The bidirectional linear thin film tape head of claim 11 wherein said ceramic comprises alumina and titanium carbide.

13. The bidirectional linear thin film tape head of claim 10, further comprising:

a second ceramic rowbar and ceramic closure opposite to and facing said gap surface.

14. The bidirectional linear thin film tape head of claim 13 wherein said flat transducing surfaces of said ceramic rowbar and said second ceramic rowbar are sloped downward and away from each other so as to form said wrap angle at each said gap surface thereof.

15. The bidirectional linear thin film tape head of claim 14, further comprising:

a carrier mounting said ceramic rowbar and ceramic closure and said second ceramic rowbar and ceramic closure so that said ceramic closures are spaced apart.

16. The bidirectional linear thin film tape head of claim 14, further comprising:

a carrier mounting said ceramic rowbar and ceramic closure and said second ceramic rowbar and ceramic closure so that said ceramic closures abut each other.

17. The bidirectional linear thin film tape head of claim 14, further comprising:

two outriggers, each spaced from one of said ceramic rowbar substrates for controlling the wrap angle of said tape at said ceramic rowbar substrates.

18. The bidirectional linear thin film tape head of claim 10 wherein said ceramic closure comprises a second ceramic rowbar without a transducer on a first surface thereof, said first surface adjacent and covering said thin film transducer at said gap surface side of said ceramic rowbar, said closure second ceramic rowbar having a flat second surface forming an extension to said flat transducing surface and a third surface forming an approximate right angle edge with respect to said second flat transducing surface parallel to said gap surface.

19. The bidirectional linear thin film tape head of claim 18 wherein said flat transducing surface of said ceramic rowbar and said flat second surface of said second ceramic rowbar form a common flat transducing surface; and additionally comprising two outriggers, each spaced from one of said ceramic rowbars for controlling the wrap angle at each edge of said common flat transducing surface thereof.

20. The bidirectional linear thin film tape head of claim 10, further comprising:

a facet between said flat transducing surface and said opposite edge forming a slope discontinuity of less than ½ of a degree with said flat transducing surface.

21. The bidirectional linear thin film tape head of claim 10, further comprising:

a blended curved surface between said flat transducing surface and said opposite edge having the larger radius nearest said flat transducing surface and a smaller radius nearest said opposite edge.

22. A magnetic tape drive for use with a magnetic recording tape, comprising:

a tape drive system for moving said magnetic recording tape linearly and bidirectionally;

a ceramic rowbar substrate having a flat transducing surface and at least one thin film transducer on a gap surface on a side of said substrate, said thin film transducer forming an extension to said flat transducing surface for contacting said moving magnetic recording tape and reading and/or writing on said tape with said thin film transducer;

a slope discontinuity edge at said transducing surface opposite said gap surface of 10 degrees or more with said flat transducing surface;

an alumina overcoat covering said thin film transducer on a side thereof opposite said gap surface of said substrate and forming a further extension to said flat transducing surface, and forming a slope discontinuity edge of 10 degrees or more with said flat transducing surface for contacting said moving magnetic tape; and at least one outrigger spaced from said ceramic rowbar substrate in said linear direction of said tape for controlling the wrap angle of said tape at said ceramic rowbar substrate to an angle between about ⅛ a degree to about 4.5 degrees.

23. The magnetic tape drive of claim 22 wherein said outrigger comprises ceramic.

24. The magnetic tape drive of claim 23 wherein said ceramic comprises alumina and titanium carbide.

25. The magnetic tape drive of claim 22 for read-while-write, further comprising:

a second ceramic rowbar and alumina overcoat opposite to, spaced from and facing said gap surface.

26. The magnetic tape drive of claim 25 wherein said flat transducing surfaces of said ceramic rowbar and said second ceramic rowbar are sloped downward and away from each other so as to form said wrap angle at each said gap surface thereof.

27. The magnetic tape drive of claim 26, further comprising:

a carrier mounting said ceramic rowbar and said second ceramic rowbar.

28. The magnetic tape drive of claim 26, additionally comprising:

two outriggers, each spaced from one of said ceramic rowbar substrates in said linear direction of said tape for controlling the wrap angle of said tape at said ceramic rowbar substrates.

29. The magnetic tape drive of claim 22, further comprising:

a facet between said flat transducing surface and said opposite edge forming a slope discontinuity of less than ½ a degree with said flat transducing surface.

30. The magnetic tape drive head of claim 22, further comprising:

a blended curved surface between said flat transducing surface and said opposite edge having the larger radius nearest said flat transducing surface and a smaller radius nearest said opposite edge.

31. A magnetic tape drive for use with a magnetic recording tape, comprising:

a motor and reel drive for moving said magnetic recording tape linearly and bidirectionally;

a ceramic rowbar substrate having a flat transducing surface and at least one thin film transducer on a gap surface on a side of said substrate, said thin film transducer forming an extension to said flat transducing surface for contacting said moving magnetic recording tape and reading and/or writing on said tape with said thin film transducer;

a slope discontinuity edge at said transducing surface opposite said gap surface of 10 degrees or more with said flat transducing surface;

a ceramic closure covering said thin film transducer on a side thereof opposite said gap surface of said substrate and forming a further extension to said flat transducing surface, and forming a slope discontinuity edge with respect to said flat transducing surface in front of said gap surface of 10 degrees or more with said flat transducing surface for contacting said moving magnetic tape; and at least one outrigger spaced from said ceramic rowbar substrate for controlling the wrap angle of said tape at said ceramic rowbar substrate to an angle between about ⅛ a degree to about 4.5 degrees.

32. The magnetic tape drive of claim 31 wherein said outrigger comprises ceramic.

33. The magnetic tape drive of claim 32 wherein said ceramic comprises alumina and titanium carbide.

34. The magnetic tape drive of claim 31 for read-while-write, further comprising:

a second ceramic rowbar and ceramic closure opposite to and facing said surface.

35. The magnetic tape drive of claim 34 wherein said flat transducing surfaces of said ceramic rowbar and said second ceramic rowbar are sloped downward and away from each other so as to form said wrap angle at each said gap surface thereof.

36. The magnetic tape drive of claim 35, further comprising:

a carrier mounting said ceramic rowbar and ceramic closure and said second ceramic rowbar and ceramic closure so that said ceramic closures are spaced apart.

37. The magnetic tape drive of claim 35, further comprising:

a carrier mounting said ceramic rowbar and ceramic closure and said second ceramic rowbar and ceramic closure so that said ceramic closures abut each other.

38. The magnetic tape drive of claim 35, further comprising:

two outriggers, each spaced from one of said ceramic rowbar substrates in said linear direction of said tape for controlling the wrap angle of said tape at said ceramic rowbar substrates.

39. The magnetic tape drive of claim 31 wherein said ceramic closure comprises a second ceramic rowbar without a transducer on a first surface thereof, said first surface abutting said first surface of said ceramic rowbar covering said thin film transducer, said closure second ceramic rowbar having a flat second surface forming an extension to said flat transducing surface and a third surface forming an approximate right angle edge with respect to said second flat transducing surface parallel to said first surface.

40. The magnetic tape drive of claim 39 wherein said flat transducing surface of said ceramic rowbar and said flat second surface of said second ceramic rowbar form a common flat transducing surface; and additionally comprising two outriggers, each spaced from one of said ceramic rowbars for controlling the wrap angle at each edge of said common flat transducing surface thereof.

41. The magnetic tape drive of claim 31, further comprising:

a facet between said flat transducing surface and said opposite edge forming a slope discontinuity of less than ½ degree with said flat transducing surface.

42. The magnetic tape drive of claim 31, further comprising:

a blended curved surface between said flat transducing surface and said opposite edge having the large radius nearest said flat transducing surface and a smaller radius nearest said opposite edge.

* * * * *